(12) United States Patent
Laine

(10) Patent No.: US 6,916,111 B2
(45) Date of Patent: Jul. 12, 2005

(54) SAILBOAT ANCHOR LIGHT HAVING HOIST STRUCTURE

(76) Inventor: Gale B. Laine, 2807 Castle Bluff Ct., S.E., Apt 101, Kentwood, MI (US) 49512

( * ) Notice: Subject to any disclaimer, the term of this patent is extended or adjusted under 35 U.S.C. 154(b) by 0 days.

(21) Appl. No.: 10/357,933

(22) Filed: Feb. 4, 2003

(65) Prior Publication Data

US 2004/0151003 A1 Aug. 5, 2004

(51) Int. Cl.$^7$ .............................................. F21V 21/16
(52) U.S. Cl. .................... 362/532; 362/477; 362/540; 362/549; 362/391; 248/125.2
(58) Field of Search ................................ 362/459, 477, 362/486, 487, 508, 523, 529, 532, 540, 549, 362, 363, 368, 372, 382, 391, 403, 418, 430; 248/121, 121.1, 124.1, 125.1, 125.2, 511, 127, 128, 132, 158, 161, 317, 323, 327, 328, 329, 332

(56) References Cited

U.S. PATENT DOCUMENTS

| | | | | |
|---|---|---|---|---|
| 133,385 A | * | 11/1872 | Read et al. ................ | 362/403 |
| 160,290 A | * | 3/1875 | Trenchard .................. | 248/404 |
| 833,167 A | * | 10/1906 | Hughes ..................... | 248/125.2 |
| 994,499 A | * | 6/1911 | Bowen ...................... | 362/477 |
| 1,757,975 A | * | 5/1930 | Perkins ..................... | 362/309 |
| 2,277,358 A | * | 3/1942 | Sauer ........................ | 439/190 |
| 3,517,184 A | * | 6/1970 | Norton et al. .............. | 362/477 |
| 3,559,224 A | * | 2/1971 | Shimizu ..................... | 362/158 |
| 3,696,241 A | * | 10/1972 | Meyer et al. ............... | 362/250 |
| 3,914,813 A | * | 10/1975 | Berchielli et al. ........... | 441/18 |
| 3,952,695 A | * | 4/1976 | Vollstedt .................... | 116/173 |
| 4,234,913 A | * | 11/1980 | Ramme ..................... | 362/158 |
| 4,272,802 A | * | 6/1981 | Steadman .................. | 362/385 |
| 4,360,862 A | * | 11/1982 | Strasser et al. ............ | 362/477 |
| 4,472,766 A | * | 9/1984 | Hung ........................ | 362/158 |
| 4,656,569 A | * | 4/1987 | Buskell ..................... | 362/418 |
| 5,957,566 A | * | 9/1999 | Chiu ......................... | 362/190 |
| 6,086,218 A | * | 7/2000 | Robertson ................. | 362/157 |
| 6,447,150 B1 | * | 9/2002 | Jen et al. ................... | 362/403 |

\* cited by examiner

*Primary Examiner*—John Anthony Ward
*Assistant Examiner*—Ismael Negron
(74) *Attorney, Agent, or Firm*—Varnum, Riddering, Schmidt & Howlett LLP

(57) ABSTRACT

A detachable sailboat anchor light and hoist structure comprises a body, a lamp mounted in an upper portion of the body so as to be visible at all points around the circumference of the body, a connector for connecting a halyard for the mast to the light such that the light is elevated to a position above the top of the mast when the light is oriented vertically and raised to the top of the mast, and a mechanism for maintaining vertical orientation of the light when the light is raised to the top of the mast. The light can be raised with the halyard to the top of the mast and can be lowered either by pulling an electrical cord interconnecting the light with the electrical system of the sailboat or by attaching a down haul to the light.

4 Claims, 6 Drawing Sheets

SAILBOAT ANCHOR LIGHT HAVING HOIST STRUCTURE

BACKGROUND OF THE INVENTION

Maritime regulations require that sailboats of a certain size display an anchor light above the highest point on the sailboat mast when the sailboat is anchored in a non-designated mooring area. The light must be visible at all points around the mast. Usually these regulations are complied with by mounting a fixed light at the top of the mast and interconnecting the light with the sailboat electrical system with an electrical cord that extends downwardly through the hollow interior of the sailboat mast. Permanent lights are somewhat expensive and expensive to install. Moreover, when periodic maintenance of the light is required, it is necessary to climb the mast or tip the boat on its side so that the top of the mast is accessible. Because of the expense and inconvenience of a permanently installed light, there are more than a few sailboats that do not comply with this regulation.

The object of the present invention is to provide a relatively inexpensive, portable light that can be raised to the top of a mast when desired and removed from the mast when not in use.

BRIEF SUMMARY OF THE INVENTION

A portable anchor light comprises a body, a lamp mounted in an upper portion of the body so as to be visible at all points around the circumference of the body, a connector for connecting a halyard for the mast to the light such that the lamp is positioned above the top of the mast when the light is oriented vertically and raised to the top of the mast, and a mechanism for maintaining vertical orientation of the light when the light is raised to the top of the mast.

The light can be raised with the halyard to the top of the mast when desired and can be lowered either by pulling an electrical cord interconnecting the light with the electrical system of the sailboat or by attaching a down haul to the light.

A number of methods can be used to maintain the light in vertical orientation. An effective and simple way and the preferred way is to attach the halyard to a lower end of the light, run the halyard upwardly along the light, and attach the halyard to the side of the light by one or more releasable straps. The highest strap is positioned sufficiently below the top of the light so that the lamp extends above the top of the mast when the light is fully raised by the halyard.

These and other features, objects, and benefits of the invention will be recognized by one having ordinary skill in the art and by those who practice the invention, from the specification, the claims, and the drawing figures.

DETAILED DESCRIPTION OF THE INVENTION

Figure 1:
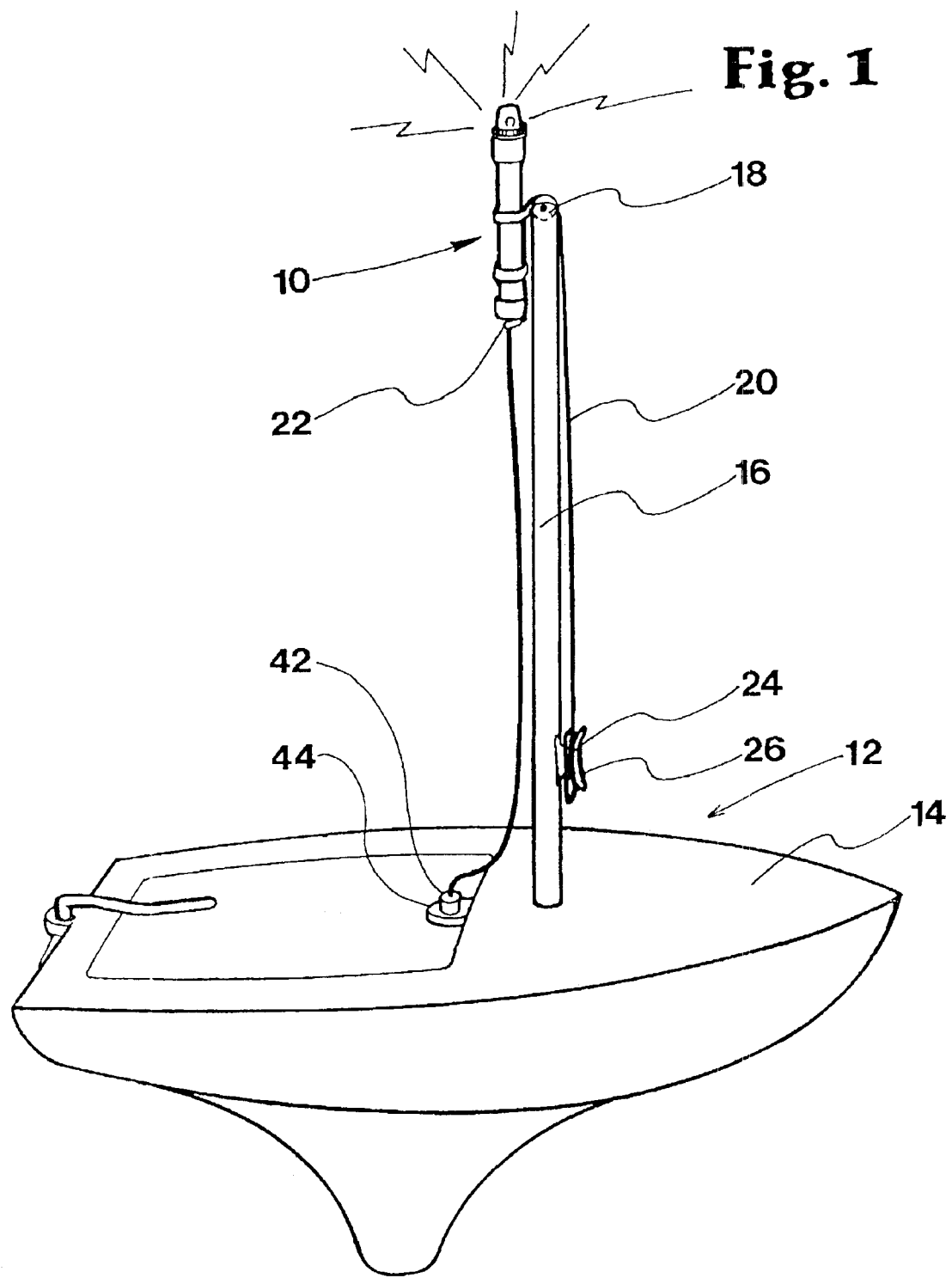
FIG. 1 is a schematic perspective view showing a first embodiment of the present invention mounted on a sailboat mast.

Referring to the drawings, a first embodiment 10 of a light constructed in accordance with the present invention is shown mounted on a sailboat 12 in FIG. 1. Sailboat 12 included a hull 14 and a mast 16 extending upwardly from the hull. These elements are shown schematically. A block or pulley 18 is mounted on an axle 19 in a fitting 21 at the top of the mast, and a line 20, called a halyard, extends over the block for the purpose of raising the sail of the sailboat. One end of the halyard includes a clip or shackle 22 for attaching the halyard to a sail for raising the sail up the mast. The opposite end 24 of the halyard is manipulated by a sailor to raise the sail up the mast. The other end of the halyard is secured to the mast by a cleat 26 or other fastener. These elements are all conventional.

Light 10 of the present invention includes an elongated tubular body or tube 30 with upper end cap 32 and lower end cap 34 mounted on opposite upper and lower ends of the tube. The tube can be conventional PVC tubing of the type used for plumbing and electrical applications. A lamp 36 is mounted in upper end cap 32 and shines outwardly through a transparent or translucent dome 38. The lamp is visible from all points around the light when the light is maintained in a vertical orientation as shown in the drawings.

Lamp 36 desirably is connected to a source of electrical power by means of an electrical cord 40 that extends from the light downwardly through lower end cap 34 to a connector such as a plug 42 (FIG. 1), which is connected to an electrical socket 44 in the sailboat. The cord is clamped to lower end cap 34 by a strain relief connector or fitting 46 attached to an opening in lower end cap 34. Connector 46 clamps electrical cord 40 to the end cap 34 so that the downward weight of the cord and any downward pulling of the cord is resisted by fitting 46 and is not transmitted to the lamp itself, which could break the electrical circuit.

Figure 2:
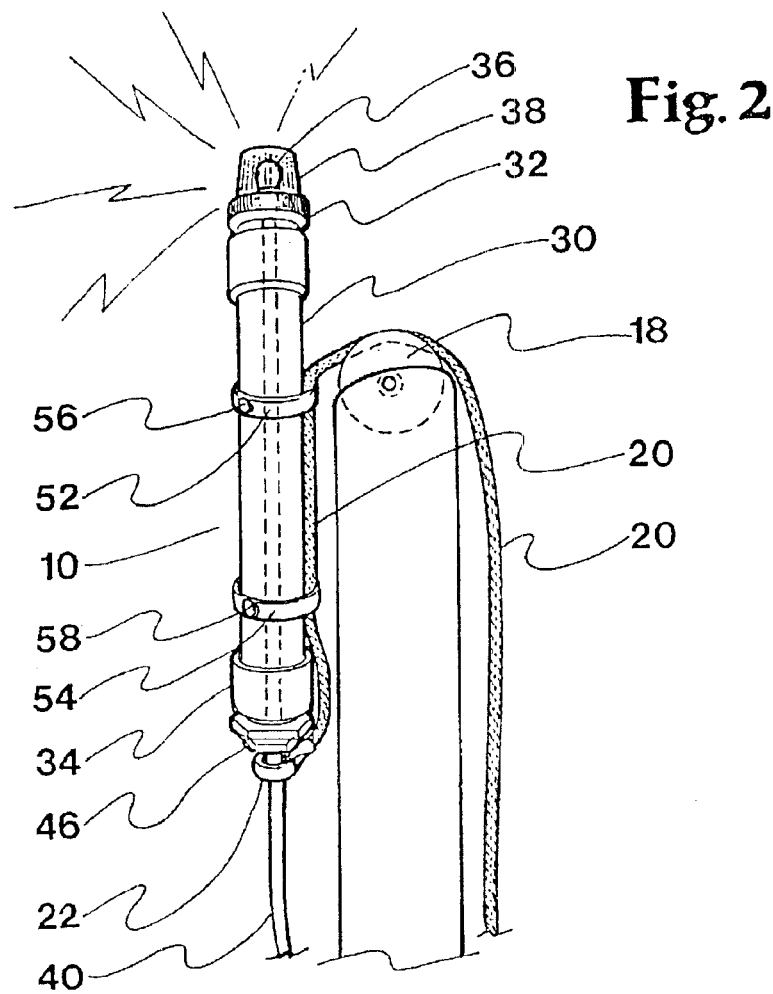
FIG. 2 is a fragmentary perspective view showing the light of FIG. 1 mounted at the top of the mast.
Figure 3:
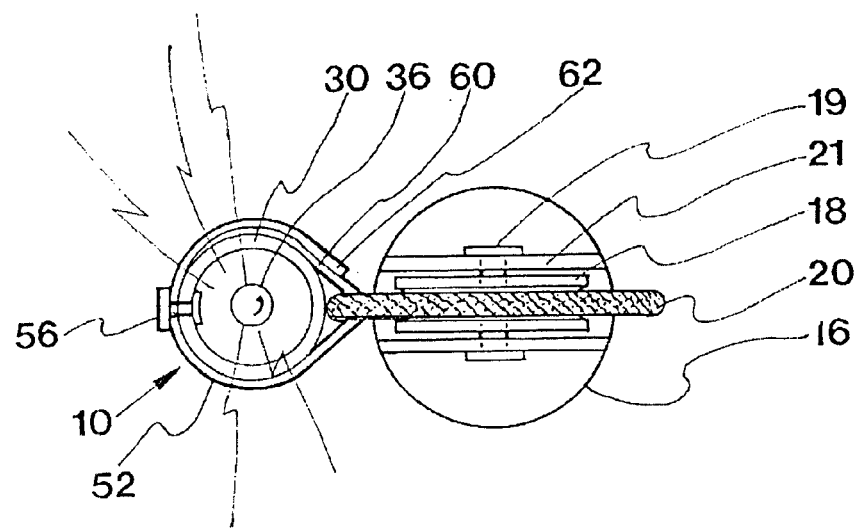
FIG. 3 is a top view of the light of FIG. 2.

In the embodiment of FIGS. 1–3, the clip 22 on the end of the halyard is clipped around cord 40 at the lower end of the light. The halyard then runs upwardly along the side of body 30 and then over block 18 and downwardly to end 24. The halyard is maintained in a position on the side of body 30 by at least one and preferably two spaced straps 52 and 54 that encircle the body. Straps 52 and 54 are attached to the body by rivets 56 and 58 or other suitable fasteners. Desirably, the straps have, open, overlapping ends such as ends 60 and 62, as shown in FIG. 3. The overlapping ends preferably are attached together by a hook and loop fastener or other suitable fastening means to provide a strap that can be fastened in a loop and released when desired. Desirably, the straps are wrapped around halyard 20 and lock it in place on the side of the body 30 of the light.

As shown in FIG. 2, the highest strap 52 is positioned below lamp 36 at the upper end of the light a sufficient distance that when the halyard is raised as far as it will go (which is when the strap 52 is raised to the point of contact with block 18) lamp 36 will protrude above the top of the mast so as to be visible from a 360 degree angle around the mast.

The halyard will hold the lamp tightly to the side of the mast at the point of attachment of strap 52. The vertical orientation of the light, with the lamp at the upper end of the light, is maintained by the weight of the electrical cord 40 as it hangs downwardly from a lower end of the lamp to the deck of the sailboat. A size 18, two conductor, SJO portable cord can be used the electrical cord. This has sufficient weight to anchor the lower end of the light in a vertical orientation but does not weigh so much so that the cable is cumbersome. The use of two straps holds the light vertical and provides a safety feature to make sure that the light remains attached to the halyard at the side of the light body.

While the foregoing is the preferred method for attaching the halyard to the light, other methods can also be used. Other examples of attachment mechanisms are shown in FIGS. 4–9. For purposes of illustration, common elements of the figures are identified with the same numerals.

Figure 4:
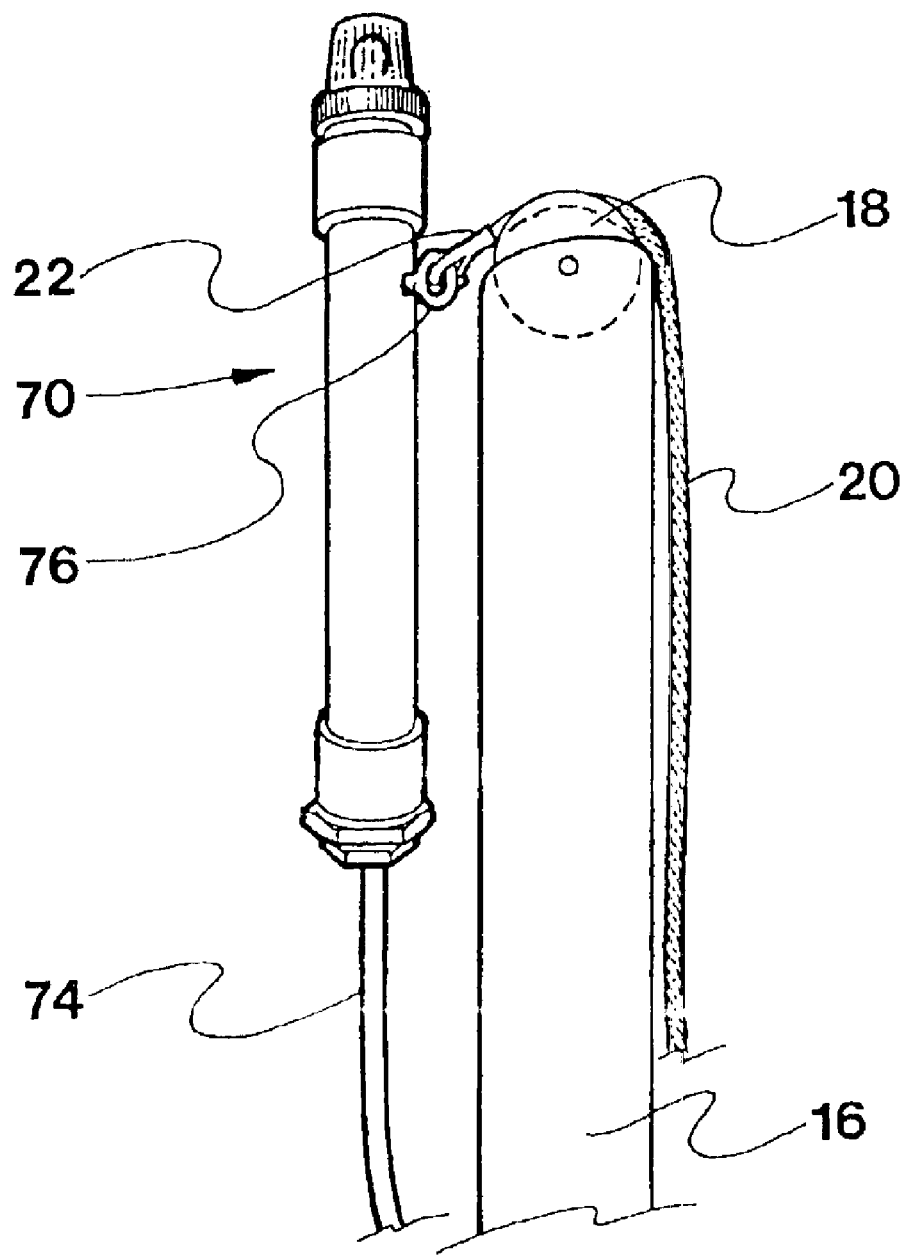
FIG. 4 is a perspective view showing a second embodiment of a light of the present invention mounted of the top of a mast.

Light 70 of FIG. 4 is the same as light 10 of FIGS. 1 and 2, with the exception that the light is attached to the halyard by means of an eye bolt 76 bolted to the side of the tube or other fastening device (which also could be the strap of FIG. 1). The electrical cord 74 holds the lamp in vertical orientation.

Figure 5:
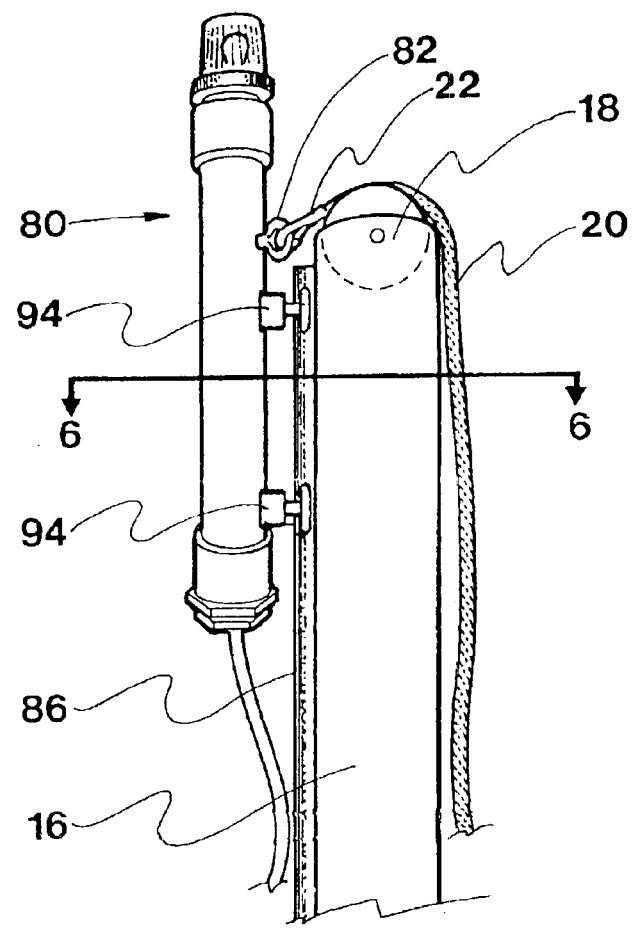
FIG. 5 is a perspective view showing a third embodiment of the present invention mounted at the top of a mast.
Figure 6:
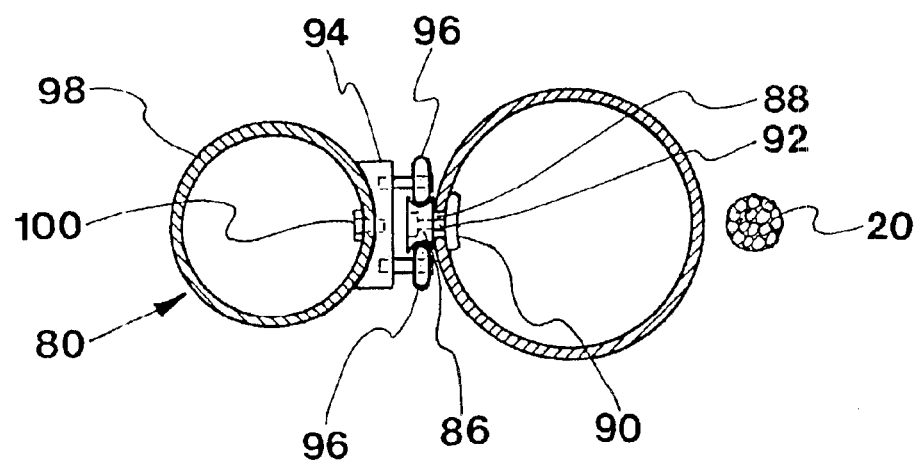
FIG. 6 is a sectional view taken along lines 6—6 of FIG. 5.
Figure 7:
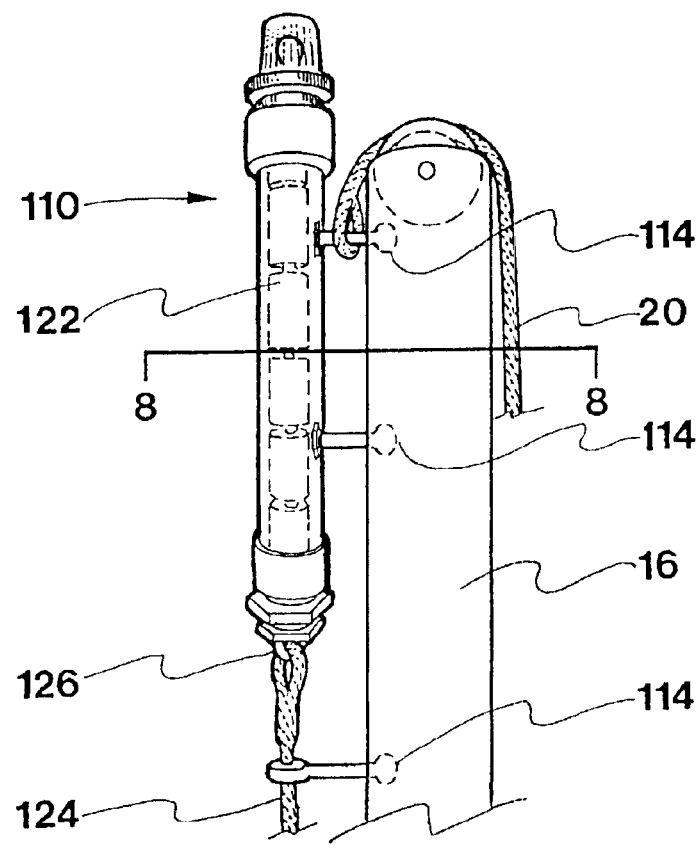
FIG. 7 is a perspective view showing a fourth embodiment of the present invention mounted at the top of the mast.
Figure 8:
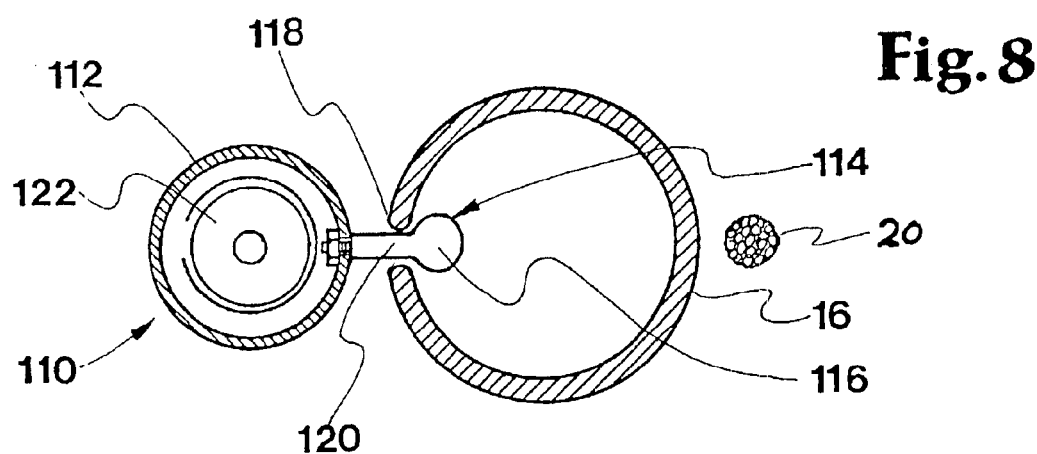
FIG. 8 is a sectional view taken along lines 8—8 of FIG. 7.

In FIG. 5, light 80 is attached to clip 22 on halyard 20 in the same manner as FIG. 4 (by an eye bolt, 82 or other clip). In this figure, however, the light is maintained in vertical orientation at least partially by a somewhat different mounting mechanism. In many sailboats, the sail is raised on the mast by means of a grooved external track 86, which is usually attached to the side of a mast by means of a slot 88 that extends the length of the mast. A plate 90 typically is positioned inside the slot, and the track is bolted to the plate by means of a bolt 92. This is conventional. Typically, a car 94 having wheels 96 mounted on opposite ends thereof is mounted on the track, with the wheels running on opposite sides of the track. The sail of the boat is attached to such cars and raised and lowered in the track. In order to raise the light of FIGS. 5 and 6, cars 94 (which may be one or more) are attached to the sides of body 98 of the light. Such attachment may be by a bolt 100 that extends through the side of the body of the light. By mounting the light on cars that are positively retained in the track on the sailboat mast, the vertical orientation and upward position of the lamp can be maintained Another embodiment of the present invention is shown in FIG. 7. This embodiment takes advantage of the grooved longitudinal slot in the sailboat mast, which is sometimes used for purposes of raising and lowering the sail. In this embodiment, light 110, having body 112, includes a T-shaped mounting member 114 bolted or otherwise fastened in the side of the body. The head 116 of the T-shaped member fits inside of the slot 118 in the mast, with a narrower neck 120 fitting through slot 118 in the mast. The T-shaped member thus holds the body of the light to the side of the mast while at the same time permitting the light to be raised and lowered along the side of the mast. One or two or more (if desired) T-shaped members 114 can be used in this construction. Another T-shaped member 114' (shown in phantom in FIG. 7) can be attached to the cord or a line extending downwardly from the lower end of the light.

Without the weight of the electrical cord, other means are necessary to hold the lamp in the proper vertical orientation. Weight of the batteries tends to do this. In addition, the use of more than one spaced T-shaped member or attachment means for attaching the light to the mast will maintain vertical orientation. This embodiment could be operated by an electrical cord as in the previous embodiments. When the batteries are used, it is necessary to employ a down haul 124 attached to an eye bolt 126 or other fastener at the bottom of the light. The down haul is a line that permits the sailor to pull the light down on the mast when it is desired to lower and remove the light.

Figure 9:
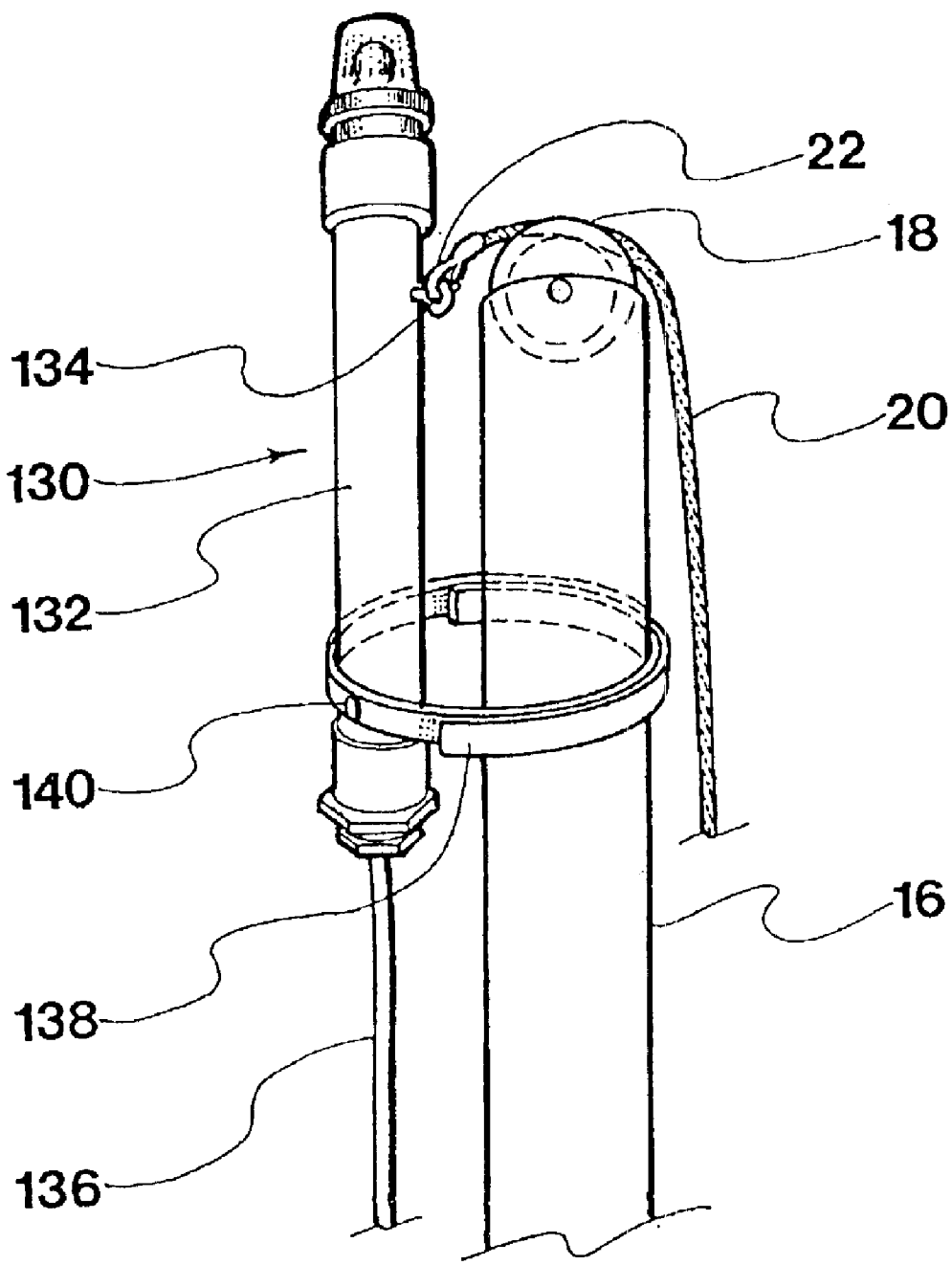
FIG. 9 is a perspective view showing a fifth embodiment of the present invention mounted at the top of a mast.

Still another embodiment 130 of the light of the present invention is shown in FIG. 9. In this embodiment, body 132 of the light is attached to clip 22 of halyard by an eye bolt 134 as described above. Or it could be attached to cable 136 at the bottom of the light, as described in FIG. 1. In this embodiment, a strap 138 attached to the body of the light by a rivet or other fastener 140 has open overlapping ends which are attached together by hook and loop fasteners, as shown in FIG. 1. In this embodiment, however, strap 138 is long enough so that it can encircle the entire mast, thus loosely holding the lower end of the light to the mast as it is raised and lowered. This construction only works on masts that do not have spreaders or other obstructive elements along the mast.

In addition to the foregoing, it is contemplated that different light shapes and different mechanisms for maintaining the orientation of the light can be employed. The main feature of all such attachment mechanisms, however, is that the lamp itself should be positioned high enough on the mast so that the lamp is visible from a 360 degree angle around the mast and that the light is not obscured at some point by the side of the mast. The embodiment of FIGS. 1–3 is the preferred embodiment of the present invention because of simplicity and demonstrated effectiveness.

In order to lower the light from the top of the mast, it is usual to pull downwardly on the electrical cord attaching the light to the mast. A separate down haul attached to the lower end of the light also could be employed. The weight of the light itself will induce lowering of the light, but a positive means for lowering the light is preferable.

It should be understood that the foregoing is merely exemplary of the present invention and that various changes in the arrangements and details of construction of the invention may be made without departing from the spirit and scope of the present invention.

I claim:

1. A detachable sailboat anchor light and structure for mounting and raising the light on a sailboat mast by means of a halyard on the mast, comprising:
   a body;
   a lamp mounted in an upper portion of the body so as to be visible at substantially all points around the outer periphery of the body, an electrical cord being connected at one end to the lamp and extending downwardly from a lower end of the body to an opposite end of the cord, the opposite end being connectable to a sailboat electrical power supply in the sailboat; and
   a connector for releasibly attaching the halyard to the light body at a point of attachment below the lamp, such that the lamp is elevated to a position above the top of the mast when the halyard is raised to a raised position and the light is oriented in an upward position, the connector including one or more straps by which the halyard is strapped to the body, an upper strap being positioned at the point of attachment below the lamp, an end of the halyard being connectable to the electrical power cord at the lower end of the body, said body, straps and electrical cord serving to urge the lamp to remain oriented in an upward position when the light is fully raised to the top of the mast.

2. A detachable sailboat anchor light according to claim 1 wherein the electrical cord serves as a means to lower the lights and the weight of the cord urges the light to remain in an upward position.

3. A detachable sailboat anchor light according to claim 1 wherein the cord is held in the body by a clamp spaced below a lamp electrical connection, such that the weight of the cord and any pull on the cord is borne primarily by the clamp and not by the lamp electrical connection.

4. A detachable sailboat anchor light according to claim 1 wherein at least one strap comprises a flexible band fixed at a given position to the body and having ends that can wrap around the halyard and hold it to the body at the point of attachment, the strap having end portions that are connected together by releasable fasteners.

* * * * *